US010138747B2

(12) United States Patent
Dev et al.

(10) Patent No.: US 10,138,747 B2
(45) Date of Patent: Nov. 27, 2018

(54) SEAL ASSEMBLY TO SEAL END GAP LEAKS IN GAS TURBINES

(71) Applicant: General Electric Company, Schenectady, NY (US)

(72) Inventors: Bodhayan Dev, Niskayuna, NY (US); Neelesh Nandkumar Sarawate, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 22 days.

(21) Appl. No.: 15/418,707

(22) Filed: Jan. 28, 2017

(65) Prior Publication Data

US 2018/0216479 A1 Aug. 2, 2018

(51) Int. Cl.
*F01D 11/00* (2006.01)
*F01D 9/04* (2006.01)
*F16J 15/02* (2006.01)

(52) U.S. Cl.
CPC ............ *F01D 11/005* (2013.01); *F01D 9/047* (2013.01); *F16J 15/02* (2013.01); *F05D 2220/32* (2013.01); *F05D 2230/60* (2013.01)

(58) Field of Classification Search
CPC ......... F01D 11/005; F01D 9/047; F16J 15/02; F16J 15/3284; F16J 15/3288; F05D 2220/32; F05D 2230/60
See application file for complete search history.

(56) References Cited

U.S. PATENT DOCUMENTS

| | | | |
|---|---|---|---|
| 5,154,577 A | 10/1992 | Kellock et al. | |
| 5,868,398 A | 2/1999 | Maier et al. | |
| 8,075,255 B2 | 12/2011 | Morgan | |
| 8,613,451 B2 | 12/2013 | Samudrala et al. | |
| 9,188,228 B2 | 11/2015 | Sarawate et al. | |
| 9,771,819 B2 * | 9/2017 | Morgan | F01D 25/24 |
| 9,863,323 B2 * | 1/2018 | Kirtley | F02C 7/28 |
| 9,869,194 B2 * | 1/2018 | Dev | F01D 11/005 |
| 2013/0022459 A1 | 1/2013 | Samudrala et al. | |
| 2013/0108418 A1 | 5/2013 | Morgan et al. | |
| 2013/0134678 A1 | 5/2013 | Sarawate et al. | |
| 2014/0062034 A1 | 3/2014 | Lacy et al. | |

(Continued)

OTHER PUBLICATIONS

Zhe et al., "Using Advanced Steam Seal Technology to Improve Steam Turbines Efficiency", Thermal Turbine, Issue: 01, 2009.

(Continued)

*Primary Examiner* — Gilbert Y Lee
(74) *Attorney, Agent, or Firm* — GE Global Patent Operation; Nitin Joshi

(57) ABSTRACT

Various embodiments include gas turbine seals and methods of forming such seals. In some cases, a turbine includes: a first arcuate component adjacent to a second arcuate component, each arcuate component including one or more slots having a seal assembly disposed therein. The seal assembly including an intersegment seal including a plurality of seal segments defining one or more end regions. One or more of the plurality of seal segments including at the one or more end regions a plurality of jet holes and a channel having a wire disposed therein, wherein the intersegment seal provides sealing of one or more end gaps defined proximate the one or more end regions in response to the thrust of a flow of pressurized air through the plurality of jet holes.

20 Claims, 9 Drawing Sheets

(56) References Cited

U.S. PATENT DOCUMENTS

| | | | |
|---|---|---|---|
| 2016/0215646 | A1 | 7/2016 | Gonyou et al. |
| 2016/0237912 | A1 | 8/2016 | Kirtley et al. |

OTHER PUBLICATIONS

Dinc et al., "Brush Seals in Industrial Gas Turbines-Turbine Section Interstage Sealing", 34th AIAA/ASME/SAE/ASEE Joint Propulsion Conference and Exhibit, 2015.

* cited by examiner

SEAL ASSEMBLY TO SEAL END GAP LEAKS IN GAS TURBINES

BACKGROUND

The subject matter disclosed herein relates to turbines. Specifically, the subject matter disclosed herein relates to seals in gas turbines.

The main gas-flow path in a gas turbine commonly includes the operational components of a compressor inlet, a compressor, a turbine and a gas outflow. There are also secondary flows that are used to cool the various heated components of the turbine. Mixing of these flows and gas leakage in general, from or into the gas-flow path, is detrimental to turbine performance.

The operational components of a gas turbine are contained in a casing. The turbine is commonly surrounded annularly by adjacent arcuate components. As used herein, the term "arcuate" may refer to a member, component, part, etc. having a curved or partially curved shape. The adjacent arcuate components include outer shrouds, inner shrouds, nozzle blocks, and diaphragms. The arcuate components may provide a container for the gas-flow path in addition to the casing alone. The arcuate components may secure other components of the turbine and may define spaces within the turbine. Between each adjacent pair of arcuate components is a space or gap that permits the arcuate components to expand as the operation of the gas turbine forces the arcuate components to expand.

Typically, one or more slots are defined on the end faces of each arcuate component for receiving a seal in cooperation with an adjacent slot of an adjacent arcuate component. Typically, straight horizontal seal slots are present. The seal is placed in the slot to prevent leakage between the areas of the turbine on either side of the seal, and more particularly the gap defined between the arcuate components. These areas may include the main gas-flow path and secondary cooling flows. These seals need to allow sufficient machining and assembly tolerance for ease of assembly at the plant site. In many instances, an end gap is defined between one or more end regions of the seal and the slot, when the seal is disposed therein, or between end regions of adjacent seal segments.

Accordingly, it is desired to provide a seal design that provides more effective sealing of leakage at end gaps defined between one or more end regions of the seal and the slot or between end regions of adjacent seal segments. In addition, it is desired to provide a seal design that accommodates manufacturing and assembly tolerances.

BRIEF DESCRIPTION

Various embodiments of the disclosure include gas turbine seal assemblies and methods of forming such seals. In accordance with one exemplary embodiment, disclosed is a seal assembly to seal a gas turbine hot gas flow path in a gas turbine. The seal assembly including an intersegment seal including a plurality of seal segments. The plurality of seal segments defining one or more end regions. The intersegment seal disposed in a slot defining a high-pressure slot side and a low-pressure slot side, wherein the slot includes a plurality of slot segments. One or more of the plurality of seal segments including at the one or more end regions a plurality of jet holes and a channel having a wire disposed therein, wherein the intersegment seal provides sealing of one or more end gaps defined proximate the one or more end regions.

In accordance with another exemplary embodiment, disclosed is a gas turbine. The gas turbine including a first arcuate component adjacent to a second arcuate component and a seal assembly. Each arcuate component including one or more slots located in an end face. Each of the one or more slots having a plurality of substantially axial surfaces and one or more radially facing surfaces extending from opposite ends of the substantially axial surfaces. The seal assembly disposed in the slot of the first arcuate component and the slot of the second arcuate component. The seal assembly comprising an intersegment seal including a plurality of seal segments. The plurality of seal segments defining one or more end regions. The intersegment seal disposed in a slot defining a high-pressure slot side and a low-pressure slot side, wherein the slot includes a plurality of slot segments. One or more of the plurality of seal segments including at the one or more end regions a plurality of jet holes and a channel having a wire disposed therein, wherein the intersegment seal provides sealing of one or more end gaps defined proximate the one or more end regions.

In accordance with yet another exemplary embodiment, disclosed is a method of assembling a seal in a turbine. The method including forming a seal assembly. The forming including providing an intersegment seal and applying the intersegment seal in a turbine. The intersegment seal including a plurality of seal segments defining one or more end regions. One or more of the plurality of seal segments including at the one or more end regions a plurality of jet holes and a channel. The step of forming the seal assembly further includes disposing a wire in each of the channels to form the seal assembly. The method further including applying the seal assembly in the turbine and flowing pressurized air through the plurality of jet holes to create thrust on the wire and provide sealing of one or more end gaps defined proximate the one or more end regions.

Other objects and advantages of the present disclosure will become apparent upon reading the following detailed description and the appended claims with reference to the accompanying drawings. These and other features and improvements of the present application will become apparent to one of ordinary skill in the art upon review of the following detailed description when taken in conjunction with the several drawings and the appended claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
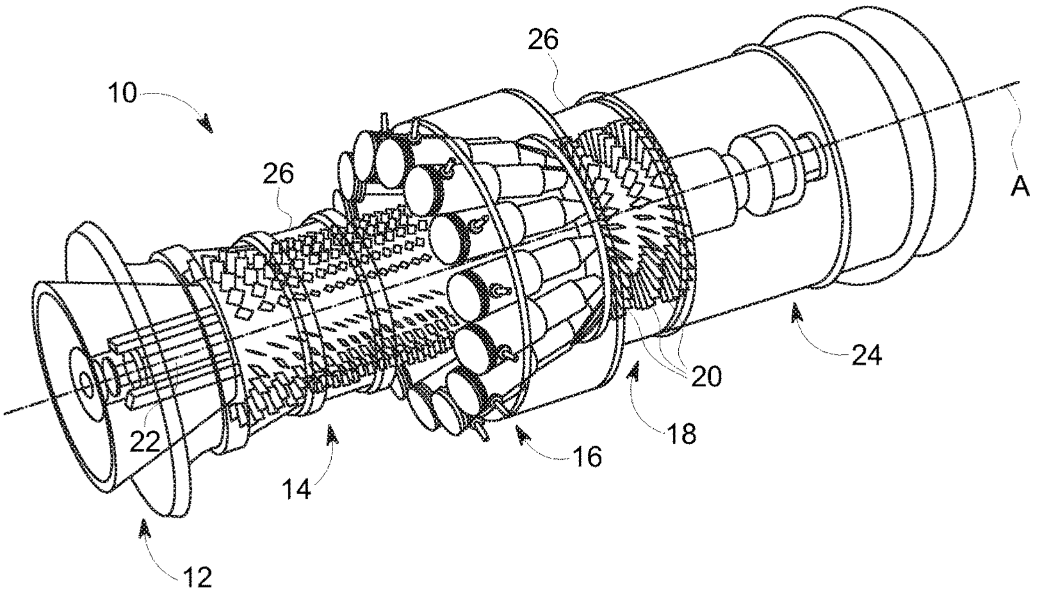
FIG. 1 PRIOR ART
FIG. 1 shows a perspective partial cut-away view of a known gas turbine.

It is noted that the drawings as presented herein are not necessarily to scale. The drawings are intended to depict only typical aspects of the disclosed embodiments, and therefore should not be considered as limiting the scope of the disclosure. In the drawings, like numbering represents like elements between the drawings.

DETAILED DESCRIPTION

As noted herein, the subject matter disclosed relates to turbines. Specifically, the subject matter disclosed herein relates to cooling fluid flow in gas turbines and the sealing within such turbines. Various embodiments of the disclosure include gas turbomachine (or, turbine) static hot gas path components, such as nozzles and shrouds.

As denoted in these Figures, the “A” axis (FIG. 1) represents axial orientation (along the axis of the turbine rotor). As used herein, the terms “axial” and/or “axially” refer to the relative position/direction of objects along the axis A, which is substantially parallel with the axis of rotation of the turbomachine (in particular, the rotor section). As further used herein, the terms “radial” and/or “radially” refer to the relative position/direction of objects along an axis (not shown), which is substantially perpendicular with axis A and intersects axis A at only one location. Additionally, the terms “circumferential” and/or “circumferentially” refer to the relative position/direction of objects along a circumference (not shown) which surrounds axis A but does not intersect the axis A at any location. It is further understood that common numbering between the various Figures denotes substantially identical components in the Figures.

Referring to FIG. 1, a perspective view of one embodiment of a gas turbine 10 is shown. In this embodiment, the gas turbine 10 includes a compressor inlet 12, a compressor 14, a plurality of combustors 16, a compressor discharge (not shown), a turbine 18 including a plurality of turbine blades 20, a rotor 22, a hot gas flow path 23 and a gas outflow 24. The compressor inlet 12 supplies air to the compressor 14. The compressor 14 supplies compressed air to the plurality of combustors 16 where it mixes with fuel. Combustion gases from the plurality of combustors 16 propel the turbine blades 20. The propelled turbine blades 20 rotate the rotor 22. A casing 26 forms an outer enclosure that encloses the compressor inlet 14, the compressor 14, the plurality of combustors 16, the compressor discharge (not shown), the turbine 18, the turbine blades 20, the rotor 22 and the gas outflow 24. The gas turbine 10 is only illustrative; teachings of the disclosure may be applied to a variety of gas turbines.

Figure 2:
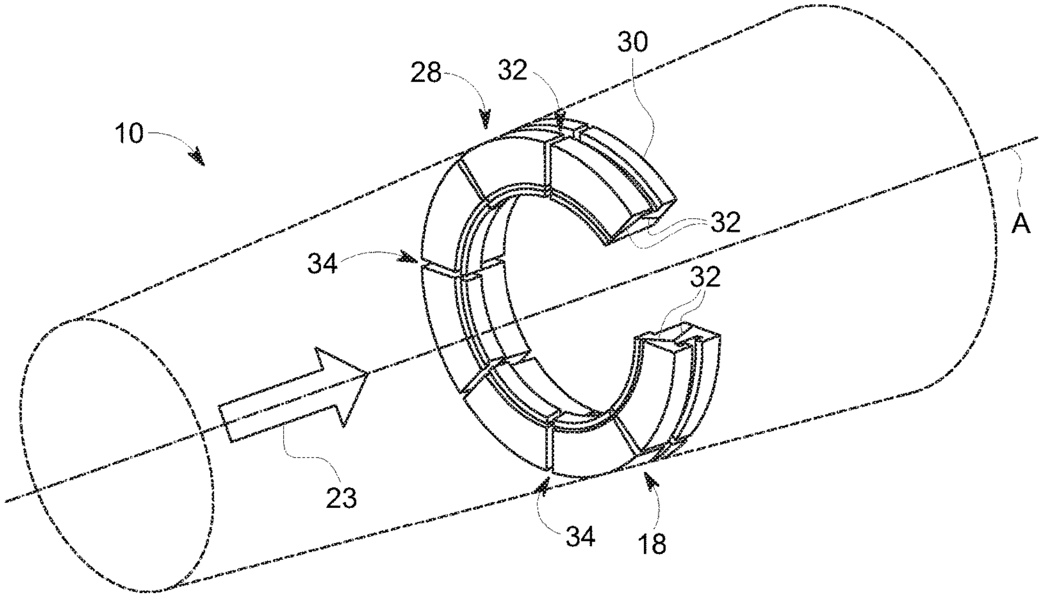
FIG. 2 PRIOR ART
FIG. 2 shows a perspective view of known arcuate components in an annular arrangement.

In an embodiment, stationary components of each stage of a hot gas path (HGP) of the gas turbine 10 consists of a set of nozzles (stator airfoils) and a set of shrouds (the static outer boundary of the HGP at the rotor airfoils 20). Each set of nozzles and shrouds are comprised of numerous arcuate components arranged around the circumference of the hot gas path. Referring more specifically to FIG. 2, a perspective view of one embodiment of an annular arrangement 28 including a plurality of arcuate components 30 of the turbine 18 of the gas turbine 10 is shown. In the illustrated embodiment, the annular arrangement 28 as illustrated includes seven arcuate components 30 with one arcuate component removed for illustrative purposes, arranged around the circumference of the hot gas flow path 23. Between each of the arcuate components 30 is an inter-segment gap 34. This segmented construction is necessary to manage thermal distortion and structural loads and to facilitate manufacturing and assembly of the hardware.

A person skilled in the art will readily recognize that annular arrangement 28 may have any number of arcuate components 30; that the plurality of arcuate components 30 may be of varying shapes and sizes; and that the plurality of arcuate components 30 may serve different functions in gas turbine 10. For example, arcuate components in a turbine may include, but not be limited to, outer shrouds, inner shrouds, nozzle blocks, and diaphragms as discussed below.

Figure 3:
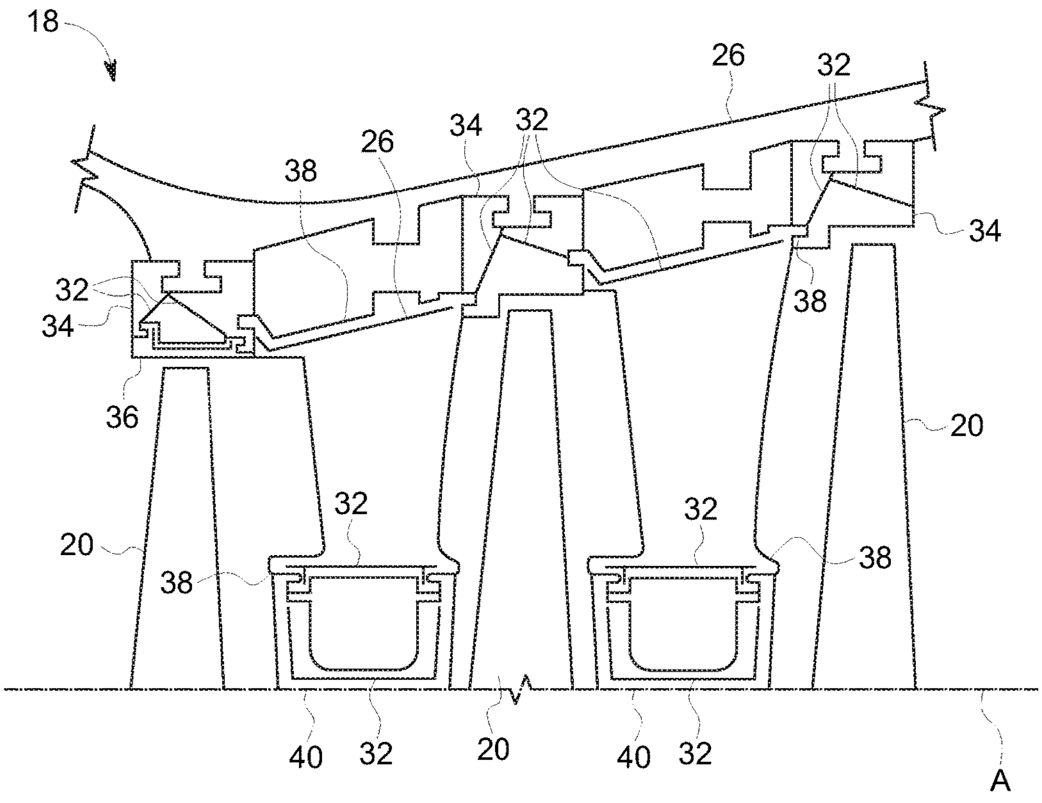
FIG. 3 PRIOR ART
FIG. 3 shows a cross-sectional longitudinal view of a portion of a known turbine of a gas turbine.

Referring to FIG. 3, a cross-sectional view of one embodiment of turbine 18 of gas turbine 10 (FIG. 1) is shown. In this embodiment, the casing 26 encloses a plurality of outer shrouds 34, an inner shroud 36, a plurality of nozzle blocks 38, a plurality of diaphragms 40, and turbine blades 20. Each of the outer shrouds 34, inner shroud 36, nozzle blocks 38 and diaphragms 40 form a part of the arcuate components 30. Each of the outer shrouds 34, inner shrouds 36, nozzle blocks 38 and diaphragms 40 have one or more slots 32 in a side thereof. In this embodiment, the plurality of outer shrouds 34 connect to the casing 26; the inner shroud 36 connects to the plurality of outer shrouds 34; the plurality of nozzle blocks 38 connect to the plurality of outer shrouds 34; and the plurality of diaphragms 40 connect to the plurality of nozzle blocks 38. A person skilled in the art will readily recognize that many different arrangements and geometries of arcuate components are possible. Alternative embodiments may include different arcuate component geometries, more arcuate components, or less arcuate components.

Cooling air is typically used to actively cool and/or purge the static hot gas path (bled from the compressor of the gas turbine engine 10) leaks through the inter-segment gaps 34 for each set of nozzles and shrouds. This leakage has a negative effect on overall engine performance and efficiency because it is parasitic to the thermodynamic cycle and it has little if any benefit to the cooling design of the hot HGP component. As previously indicated, seals are typically incorporated into the inter-segment gaps 34 of static HGP components to reduce leakage. The one or more slots 32 provide for placement of such seals at the end of each arcuate component 30.

These inter-segment seals are typically straight, rectangular solid pieces of various types of construction (e.g. solid, laminate, shaped, such as “dog-bone”). The seals serve to seal the long straight lengths of the seal slots 32 fairly well, but they are prone to leakage where the seal meets the slot slots 32, commonly referred to as end gap leakage. In many instances, the seals typically need to be shorter than the seal slots 32 to accommodate manufacturing variation and assembly constraints, resulting in the leakage being even larger. It is a significant benefit to engine performance and efficiency to seal these leaks more effectively. This is a challenging engine design detail because of numerous design constraints including the tight spaces in the inter-segment gaps 34 and seal slots 32, the need for relatively easy assembly and disassembly, machining-assembly tolerances, thermal movement during engine operation.

Figure 4:
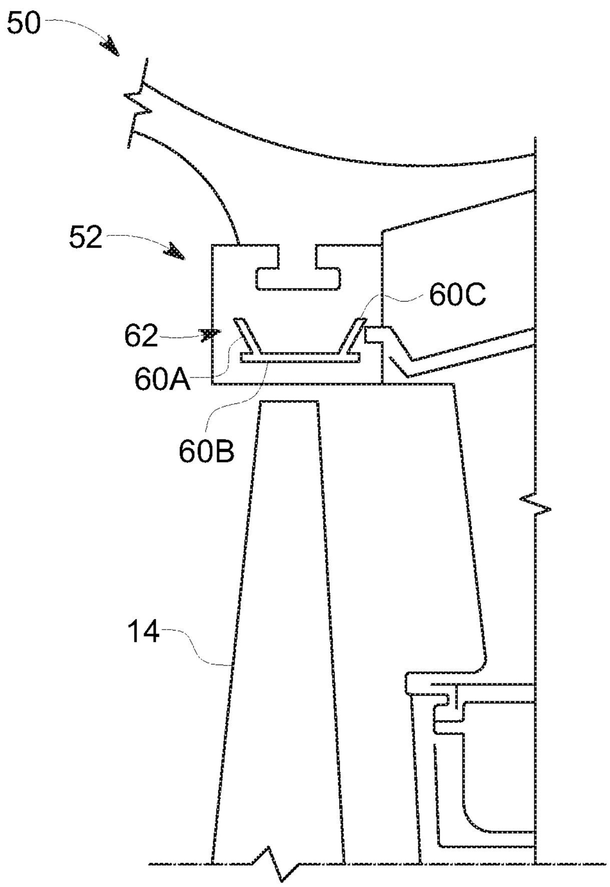
FIG. 4 shows a schematic cross-sectional view of a portion of a turbine, in accordance with one or more embodiments shown or described herein.
Figure 5:
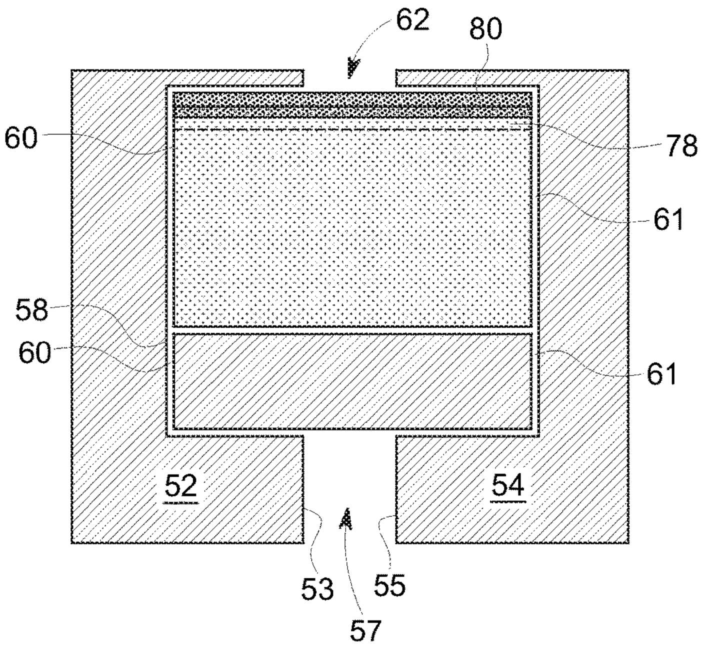
FIG. 5 shows a cross-sectional view of a seal assembly of FIG. 4 in relation to a first arcuate component and a second arcuate component, in accordance with one or more embodiments shown or described herein.
Figure 6:
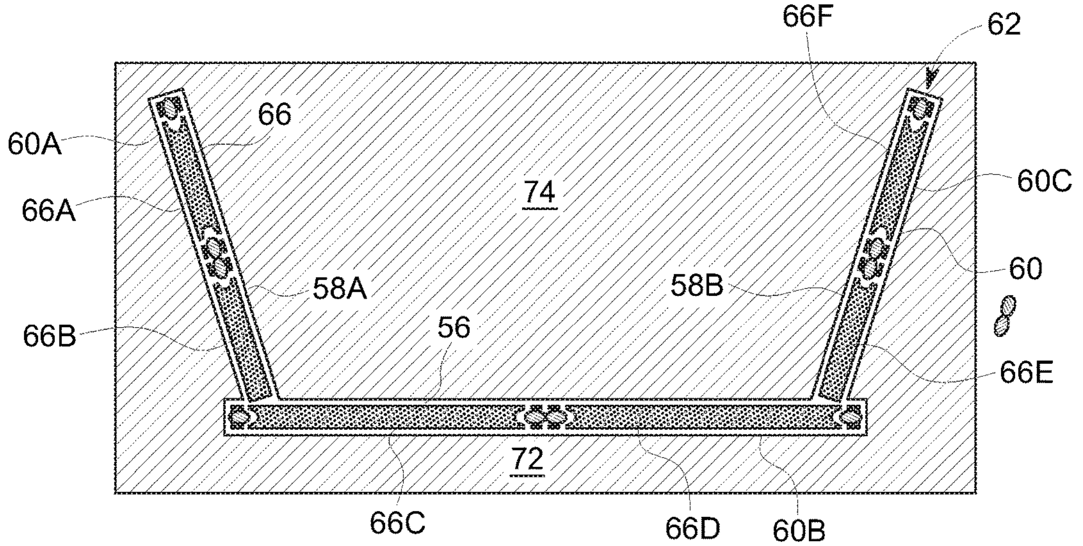
FIG. 6 shows a cross-sectional view of a seal assembly of FIG. 4, during an actuated state of operation, in relation to a first arcuate component, in accordance with one or more embodiments shown or described herein.
Figure 7:
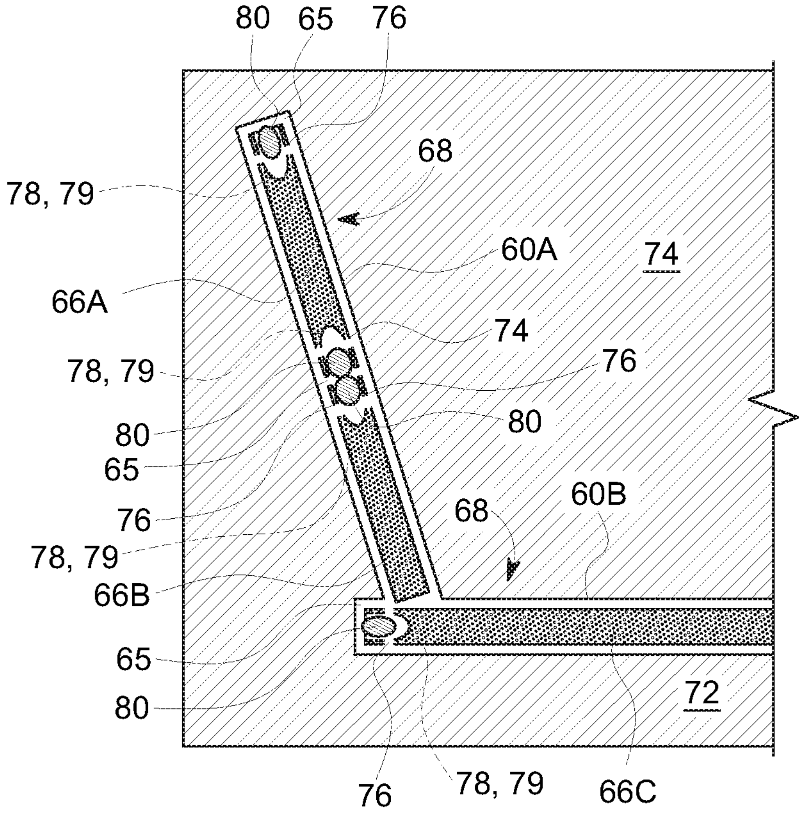
FIG. 7 shows an enlarged schematic cross-sectional view of a portion of the seal assembly of FIG. 6, during a non-actuated state of operation, in accordance with one or more embodiments shown or described herein.
Figure 8:
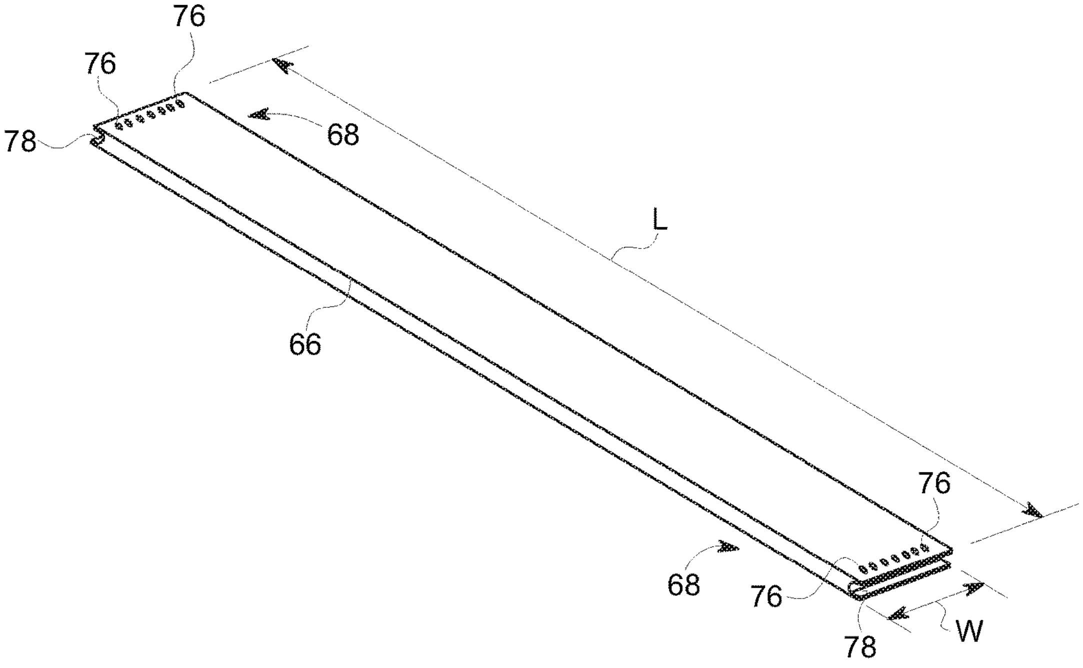
FIG. 8 shows an isometric view of a seal segment of the seal assembly of FIG. 6, in accordance with one or more embodiments shown or described herein.
Figure 9:
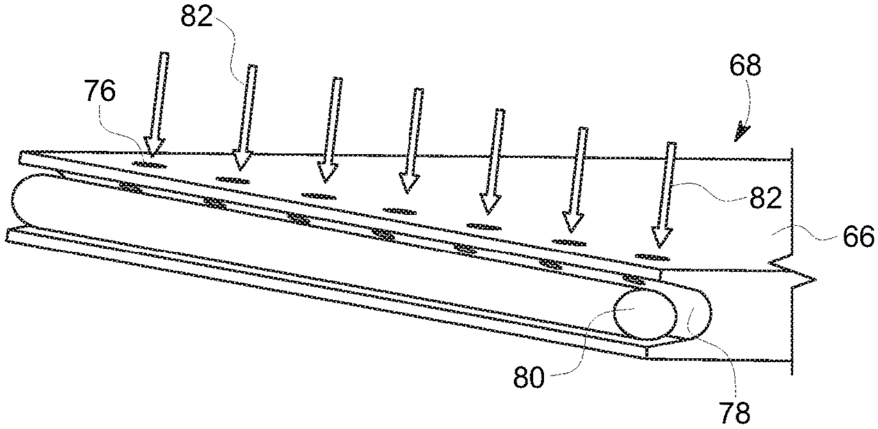
FIG. 9 shows an isometric view of a portion of the seal segment of FIG. 8, in accordance with one or more embodiments shown or described herein.

Turning to FIGS. 4-9, a cross-sectional longitudinal view of a gas turbine 50 is shown in FIG. 4, according to an embodiment. FIG. 4 shows an end view of an exemplary, and more particularly, a first arcuate component 52. FIG. 5 shows a cross-sectional view of the first arcuate component 52 and a second arcuate component 54, in spaced relation to one another, and having a seal assembly according to this disclosure disposed relative thereto. FIG. 6 shows an enlargement of a portion of the gas turbine engine 50, illustrating the seal assembly disclosed herein. FIG. 7 shows a further enlargement of a seal assembly as disclosed herein. FIG. 8 shows a seal segment of the seal assembly of FIG. 6. FIG. 9 shows an enlargement of a portion of the seal segment of FIG. 8.

Referring more particularly to FIG. 4, illustrated is a portion of the gas turbine 50 including the first arcuate component 52. The first arcuate component 52 includes a slot 60 formed in an end face 53 of the first arcuate component 52. The slot 60 may be comprised of multiple slot portions 60A, 60B and 60C shown formed at an angle in relation to each other and connected to one another. The slot 60 may be comprised of any number of intersecting or connected slot portions.

FIG. 5 shows a cross-sectional axial view of a seal assembly in relation to the first arcuate component 52 and the second arcuate component 54. More particularly, illustrated is the first arcuate component 52 positioned adjacent to the second arcuate component 54. An intersegmental gap 57 is left between the first arcuate component 52 and the second arcuate component 54. An adjacent slot 61 on the second arcuate component 54 is shown. Similar to slot 60, the slot 61 may be formed of multiple slot portions formed at an angle in relation to each other and connected or intersecting to one another. Each slot 60, 61 includes a plurality of substantially axial surfaces 56, as best illustrated in FIGS. 4, 6 and 7, and a plurality of radially facing surfaces 58 extending from the end of the substantially axial surfaces 56, as shown in relation to slot 60. Alternate configurations and geometries of the slots 60, 61, including alternate seal slot geometry intersections, are anticipated by this disclosure.

In the illustrated embodiment of FIGS. 4-9, the gas turbine 50 includes a seal assembly 62 disposed in the one or more slots 60 or 61 (FIG. 5) where the seal assembly 62 contacts adjacent cooperating slots 60, 61 at their axial surfaces 56, and extends over the radially facing surfaces 58. It should be understood that the description of the seal assembly 62 will be illustrated and described below in relation to slot 60 of the first arcuate component 52, but is similarly applicable to slot 61 of the second arcuate component 54 upon disposing therein.

FIG. 6 illustrates the seal assembly 62, during operation and thus actuation of the sealing properties, and FIG. 7 is an enlargement of a portion of the seal assembly 62 FIG. 6, during a non-operable state and thus non-actuation of the seal properties. As best illustrated in FIGS. 6 and 7, the seal assembly 62 includes an intersegment seal 66 including a plurality of seal segments 66A, 66B, 66C, 66D, 66E and 66F. Alternate configurations of the intersegment seal 66, including alternate seal segment numbers, are anticipated by this disclosure. In the illustrated embodiment, the intersegment seal 66 is manufactured using well-known additive manufacturing (AM) processes, whereby successive layers of material are formed under computer control to create each of the seal segments 66A, 66B, 66C, 66D, 66E and 66F. In general, additive manufacturing techniques involve applying a source of energy, such as a laser or electron beam, to deposit powder layers in order to grow a part having a particular shape and features. In an embodiment, the plurality of seal segments 66A, 66B, 66C, 66D, 66E and 66F are formed using 3D printing techniques. In an alternate embodiment, the plurality of seal segments 66A, 66B, 66C, 66D, 66E and 66F are formed using Direct Metal Laser Melting (DMLM).

In the illustrated embodiment, the plurality of seal segments 66A, 66B, 66C, 66D, 66E and 66F are disposed proximate the slot 60 and define one or more gaps between the seal segments and/or between the seal segments and the slot 60, where leakage may occur. More particularly, as illustrated in FIGS. 6 and 7, the plurality of intersegment seal segments 66A, 66C, 66D and 66E define a seal end gap 65 at the end regions 68 of the seal segments 66A, 66C, 66D, and 66E, proximate the slot 60 where leakage may occur. In addition, the plurality of intersegment seal segments 66A, 66B, 66C, 66D, 66E and 66F define a seal end gap 65 between neighboring (adjacent) segments (e.g., 66A and 66B, 66C and 66D, etc.), and more particularly proximate the end regions 68 of each of the segments. The intersegment seal 66 is disposed in the slot 60 defining a high-pressure slot side 74 and a low-pressure slot side 72, wherein the slot 60 includes the plurality of slot segments 60A, 60B, and 60C. More particularly, each seal segment 66A, 66B, 66C, 66D, 66E and 66F is disposed in a slot segment 60A, 60B and 60C. As best illustrated in FIG. 7, in an embodiment, the intersegment seal 66 may comprise a plurality of the seal segments, such as the seal segments 66A and 66B, to be disposed in a single slot, such as slot 60A, thereby allowing for flexibility of the overall intersegment seal 66 (e.g., torsional movement). In an alternate embodiment, each slot 60A, 60B and 60C may have a single seal segment disposed therein.

As previously stated, the intersegment seal 66 includes the plurality of seal segments 66A, 66B, 66C, 66D, 66E and 66F where each segment is separated from its neighboring (adjacent) segment (e.g., 66A and 66B), or the slot 60, by an end gap 65, with each disposed in one of the multiples slot segments 60A, 60B and 60C. It is anticipated that the intersegment seal 66 may be comprised of any number of segments, and that the six segment seal and cooperating slots of FIG. 6 are merely for illustrative purposes. The plurality of segments 66A, 66B, 66C, 66D, 66E and 66F of the intersegment seal 66 may correspond with a distinct surface of the slot 60 (e.g., segments 66A and 66B correspond with a first radially facing surface 58A of the slot segment 60A, segments 66C and 66D correspond with the axial surface 56 of the slot segment 60B and segments 66E and 66F correspond with a second radially facing surface 58B of the slot segment 60C, etc.).

Referring now to FIGS. 7-9, the intersegment seal 66, and more particularly the plurality of seal segments 66A, 66B, 66C, 66D, 66E and 66F, are configured to allow sufficient machining and assembly tolerance for ease of assembly, such as at a plant site. As previously stated, the seal 66, and more particularly each of the plurality of seal segments 66A, 66B, 66C, 66D, 66E and 66F, are manufactured using additive manufacturing techniques and include a plurality of jet holes 76 and a channel 78 at each seal segment end region 68. In the illustrated embodiment, the channel 78 is a generally U-shaped channel 79. In alternate embodiments, the channel 78 may include any geometry capable of disposing a wire (described presently) therein. In an embodiment, computer aided design (CAD) technology is used to initially provide the geometry of the seal segment design, and then the CAD geometry is used to fabricate the seal efficiently in an additive manufacturing device, such as a 3D printer. In an embodiment, each of the seal segments 66A, 66B, 66C, 66D, 66E and 66F has a width "W" and overall length "L" adapted for disposing within the slot 60. Each jet hole 76 is configured as an aperture extending through the end region 68 of each seal segment 66A, 66B, 66C, 66D, 66E and 66F. More particularly, each of the jet holes 76 extends through the end region 68 into the channel 78, so as to be in flow communication therewith. As previously alluded to, disposed within each channel 78 is a wire 80. For ease of assembly, the wires 80 may be installed with adequate epoxy/glue which would eventually melt out at the operating condition. In an embodiment, each of the wires 80 may be formed of a high temperature alloy, such as a nickel-chromium alloy, including, but not limited to Nichrome, Inconel, Haynes 230, or similar material resistant to high temperatures.

Subsequent to disposing of the seal assembly 62 within the slots 60 and during normal operating conditions, a flow of high pressurized air 82 is flowed through the jet holes 76 to create thrust on the wires, to provide sealing of the end gaps 65. More specifically, as a result of the thrust exerted thereon the wire 80, the wire 80 is pushed out of the channel 78 to seal the end gaps 65. In an embodiment, the high pressurized air 82 may be provided by one or more stages of the turbine. In an embodiment, the high pressurized air 82 may be bleed air-flow from different stages of the compressor 14 (FIG. 1) and is generally colder in temperature than the hot gas flow path 23 (FIG. 2). The inter-segment seal thus provides sealing between the high pressurized cold air-flow and the hot gas flow path 23.

According to an embodiment the intersegment seal 66 (including segments 66A, 66B, 66C, 66D, 66E and 66F) are adapted to move independently of one another. In an embodiment, the wire 80, and or wires 80, substantially seals the end gaps 65 and resultant leakage defined by the seal 66, and more particularly defined between neighboring seal segments 66A and 66B, 66B and 66C, 66C and 66D and 66D and 66E), and/or between the seal segments 66A, 66C, 66D and 66F.

Figure 10:
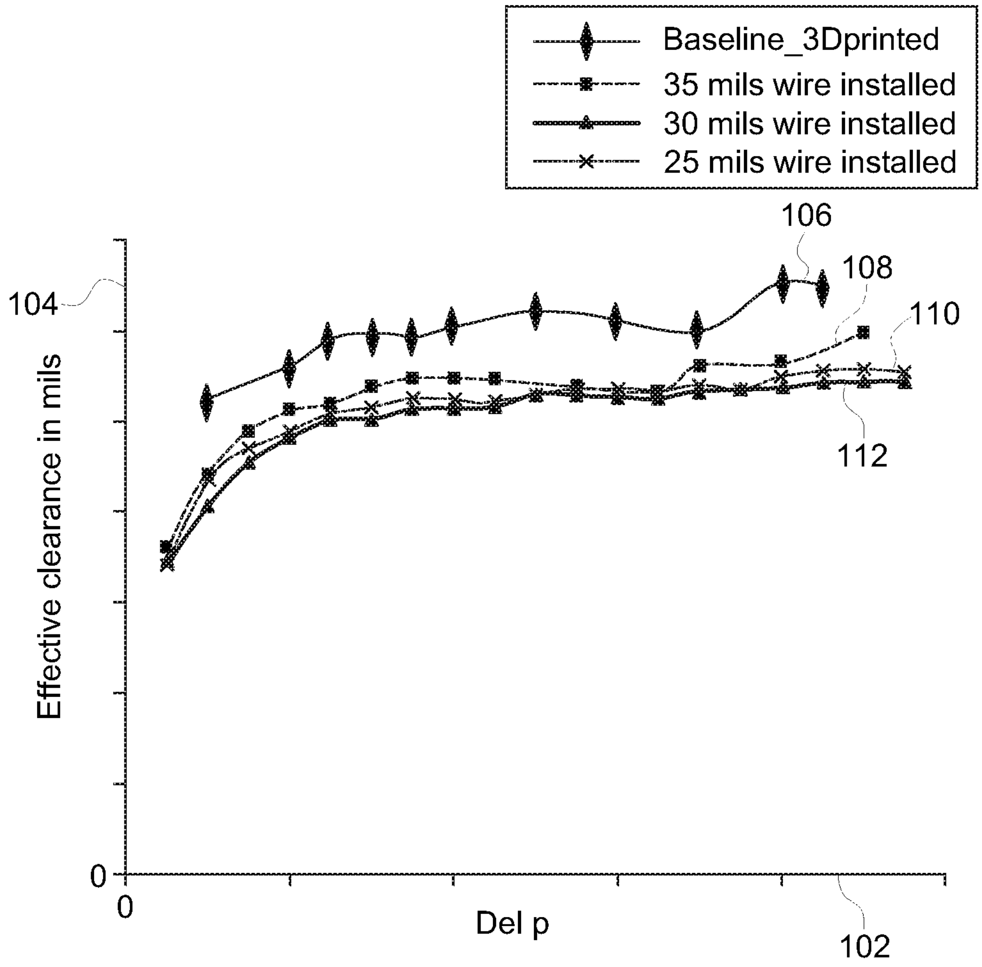
FIG. 10 shows a graph plotting leakage data of a plurality of seals including four different wire diameters, relative to a baseline test.

Referring now to FIG. 10, as represented in graph 100, tests were conducted with four different wire diameters, relative to a baseline test. The results indicated a prominent drop in leakage, measured in psi, across each of the seals, plotted on x-axis 102, in relation to the effective clearance in the respective seal, plotted on y-axis 104, in mils. The baseline test data, plotted at line 106, was conducted without installing the wire, such as wire 80, in the channel, such as channel 78. Further tests were conducted with different wire diameters. More particularly, a first wire of 35 mils diameter is plotted at line 108, a second wire of 30 mils diameter is plotted at line 110, and a third wire of 25 mils diameter is plotted at line 112. Test results indicated a prominent drop in leakage as illustrated in graph 100. For the given seal length and slot dimensions tested, the end gap was approximately 0.6 mils. The test data indicates that the present sealing concept was able to reduce the effective clearance up to approximately 0.5 mils thus validating the seal design.

The arrangement as disclosed provides a compact, relatively simple seal design that can be at least partially pre-assembled to aid in engine assembly (e.g., numerous seal pieces of the seal assembly 62 may be held together with shrink-wrap, epoxy, wax, or a similar substance that burns away during engine operation). In alternate embodiments, the seal is assembled in the engine piece-by-piece (no binding materials) and may not include any pre-assembly.

Figure 11:
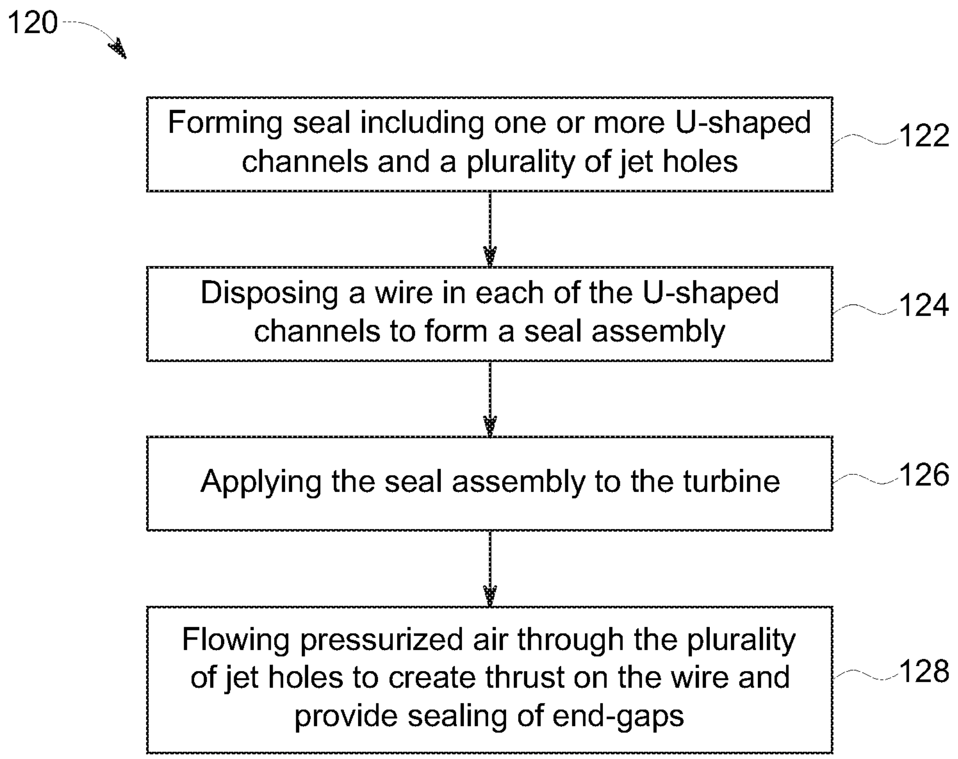
FIG. 11 shows a flow diagram illustrating a method, in accordance with one or more embodiments shown or described herein.

FIG. 11 is a flow diagram illustrating a method 120 of forming a seal in a gas turbine according to the various Figures. The method can include the following processes:

Process P1, indicated at 122, includes forming a seal assembly (e.g., seal assembly 62), the forming including providing an intersegment seal 66. The intersegment seal 66 including a plurality of seal segments 66A, 66B, 66C, 66D, 66E and 66F, each comprised of a plurality of jet holes 76 and channel 78 in one or more of the end regions 68. The seal segments 66A, 66B, 66C, 66D, 66E and 66 formed by an additive manufacturing process. The plurality of seal segments 66A, 66B, 66C, 66D, 66E and 66 defining one or more end gaps 65.

As noted above, additive manufacturing techniques are used to manufacture the seal segments 66A, 66B, 66C, 66D, 66E and 66F and generally allow for construction of custom parts having complex geometries, curvatures, and features, such as the plurality of jet holes 76 and the channels 78, discussed herein.

Additive manufacturing may be particularly useful in the construction the plurality of jet holes 76 and the channels 78 for each of the seal segments 66A, 66B, 66C, 66D, 66E and 66F, as the seal segments 66A, 66B, 66C, 66D, 66E and 66F may each be constructed as a monolithic structure from high-strength materials that may be difficult to machine or tool using traditional methods. In addition, additive manufacturing techniques provide the capability to construct complex solid objects from computer models, without difficult machining steps. In general, additive manufacturing techniques involve applying a source of heat, such as a laser or electron beam, to deposited powder layers (e.g., layer after layer) in order to grow a part having a particular shape.

In the exemplary embodiment, the plurality of jet holes 76 and the channels 78 for each of the seal segments 66A, 66B, 66C, 66D, 66E and 66F are fabricated using an additive manufacturing process. Specifically, additive manufacturing process known as 3D printing, direct metal laser sintering (DMLS) or direct metal laser melting (DMLM) may be used to manufacture seal segments 66A, 66B, 66C, 66D, 66E and 66F. Alternatively, the additive manufacturing method is not limited to the 3D printing, DMLS or DMLM process, but may be any known additive manufacturing process.

Process P2, indicated at 164, includes disposing a wire 80 in each of the channels 78 to form the seal assembly.

Process P3, indicated at 166, includes applying the seal assembly (e.g., the seal assembly 62) to a turbine (e.g., gas turbine 50, FIG. 4), where applying includes inserting the seal assembly 62 in a slot 60. More specifically, the intersegment seal 66 is disposed in a slot 60 defining a high-pressure slot side 74 and a low-pressure slot side 72, wherein the slot 60 includes a plurality of slot segments 60A, 60B, and 60C. In an embodiment, the seal assembly 62 is disposed adjacent to the axial surfaces 56 and extends over the radially facing surfaces 58 of the slot 60.

Process P4, indicated at 166, includes flowing a pressurized air 82 through the jet holes 76 to create thrust on the wire 80 and provide sealing of the end gaps 65.

It is understood that in the flow diagram shown and described herein, other processes may be performed while not being shown, and the order of processes can be rearranged according to various embodiments. Additionally, intermediate processes may be performed between one or more described processes. The flow of processes shown and described herein is not to be construed as limiting of the various embodiments.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A seal assembly to seal a gas turbine hot gas flow path in a gas turbine, the seal assembly comprising:
- an intersegment seal including a plurality of seal segments, the plurality of seal segments defining one or more end regions, the intersegment seal disposed in a slot defining a high-pressure slot side and a low-pressure slot side, wherein the slot includes a plurality of slot segments, one or more of the plurality of seal segments including at the one or more end regions a plurality of jet holes and a channel having a wire disposed therein, wherein the intersegment seal provides sealing of one or more end gaps defined proximate the one or more end regions.

2. The seal assembly of claim 1, wherein each of the plurality of seal segments is comprised of an additive manufactured material.

3. The seal assembly of claim 1, wherein the wire is moveable within the channel in response to a pressurized thrust of air exerted through the plurality of jet holes.

4. The seal assembly of claim 1, wherein the channel is a U-shaped channel.

5. The seal assembly of claim 1, wherein the one or more end gaps are defined between adjacent seal segments of the plurality of seal segments.

6. The seal assembly of claim 1, wherein the one or more end gaps are defined between one or more seal segments of the plurality of seal segments and the seal slot.

7. The seal assembly of claim 1, wherein the one or more end gaps are defined between the seal slot and one or more seal segments of the plurality of seal segments and between adjacent seal segments of the plurality of seal segments.

8. The seal assembly of claim 1, wherein the wire has a diameter in a range of 25-35 mils.

9. The seal assembly of claim 1, wherein the one or more end gaps have a dimension of 0.6 mils.

10. The seal assembly of claim 1, wherein the wire is comprised of a nickel-chromium alloy.

11. A gas turbine comprising:
- a first arcuate component adjacent to a second arcuate component, each arcuate component including one or more slots located in an end face, each of the one or more slots having a plurality of substantially axial surfaces and one or more radially facing surfaces extending from opposite ends of the substantially axial surfaces; and
- a seal assembly disposed in the slot of the first arcuate component and the slot of the second arcuate component, the seal assembly comprising:
  - an intersegment seal including a plurality of seal segments, the plurality of seal segments defining one or more end regions, the intersegment seal disposed in a slot defining a high-pressure slot side and a low-pressure slot side, wherein the slot includes a plurality of slot segments, one or more of the plurality of seal segments including at the one or more end regions a plurality of jet holes and a channel having a wire disposed therein, wherein the intersegment seal provides sealing of one or more end gaps defined proximate the one or more end regions.

12. The gas turbine of claim 11, wherein the intersegment seal is comprised of an additive manufactured material.

13. The gas turbine of claim 11, wherein the wire is moveable within the channel in response to a pressurized thrust of air exerted through the plurality of jet holes.

14. The seal assembly of claim 11, wherein the channel is a U-shaped channel.

15. The gas turbine of claim 11, wherein the one or more end gaps are defined between adjacent seal segments of the plurality of seal segments.

16. The gas turbine of claim 11, wherein the one or more end gaps are defined between one or more seal segments of the plurality of seal segments and the seal slot.

17. The gas turbine of claim 11, wherein the one or more end gaps are defined between the seal slot and one or more seal segments of the plurality of seal segments and between adjacent seal segments of the plurality of seal segments.

18. A method of assembling a seal in a turbine, the method comprising:
- forming a seal assembly, the forming including:
  - providing an intersegment seal including a plurality of seal segments defining one or more end regions, one or more of the plurality of seal segments including at the one or more end regions a plurality of j et holes and a channel;
  - disposing a wire in each of the channels to form the seal assembly;
- applying the seal assembly in the turbine; and
- flowing pressurized air through the plurality of jet holes to create thrust on the wire and provide sealing of one or more end gaps defined proximate the one or more end regions.

19. The method of claim 18, wherein the turbine comprises:
- a first arcuate component adjacent to a second arcuate component, each arcuate component including one or more slots located in an end face, each of the one or more slots having a plurality of axial surfaces and radially facing surfaces extending from opposite ends of the axial surfaces;
- the applying the seal assembly in the turbine including inserting the seal assembly in a slot of the one or more slots such that the intersegment seal is disposed in the slot on each arcuate component and in contact with the axial surfaces of the slots and extending over the radially facing surfaces of the slots.

20. The method of claim 18, wherein each of the plurality of seal segments is comprised of an additive manufactured material.

* * * * *